United States Patent [19]

Tanaka et al.

[11] Patent Number: 4,518,398
[45] Date of Patent: May 21, 1985

[54] MANUFACTURING PROCESS FOR SINTERED CERAMIC BODY FOR CUTTING TOOLS

[76] Inventors: Hiroshi Tanaka, Gomyokuroji, Yatomi-cho, Ama-gun, Aichi-ken; Yoshihiro Yamamoto, 14-402 Iwakuradanchi, Higashishinmachi Iwakura, Aichi-ken, both of Japan

[21] Appl. No.: 170,164

[22] Filed: Jul. 18, 1980

[30] Foreign Application Priority Data

Jul. 20, 1979 [JP] Japan .................. 54-92906

[51] Int. Cl.³ .............. B24D 3/16; C04B 35/10; C04B 35/52; C04B 35/58
[52] U.S. Cl. .................. 51/309; 264/65; 264/66; 264/570; 501/87; 501/96; 501/127; 501/153
[58] Field of Search .............. 51/309; 264/65, 66, 264/570; 501/87, 96, 127, 153

[56] References Cited

U.S. PATENT DOCUMENTS

| 4,204,873 | 5/1980 | Yamamoto et al. | 51/309 |
| 4,249,914 | 2/1981 | Ogawa et al. | 51/309 |
| 4,325,710 | 4/1982 | Tanaka et al. | 51/309 |
| 4,366,254 | 12/1982 | Rich et al. | 51/309 |

FOREIGN PATENT DOCUMENTS

| 1048530 | 1/1959 | Fed. Rep. of Germany | 501/127 |
| 2519569 | 12/1975 | Fed. Rep. of Germany | 51/309 |
| 50-89410 | 7/1975 | Japan . | |
| 53-130208 | 11/1978 | Japan . | |

*Primary Examiner*—James H. Derrington

[57] ABSTRACT

A sintered ceramic body for cutting tools having a residual porosity of not exceeding 0.2% by volume and mean crystal grain size of not exceeding $2\mu$ is obtained by sintering a mixture substantially consisting of 70–95% by volume alumina and the balance of titanium nitride and Zr-containing component(s) such as Zr, ZrC and/or ZrN wherein the volumetric ratio of TiN/Zr-containing component(s) ranges 95/5–50/50 under the pressure application of 50–3000 Kg/cm². The sintering may be carried out by hot pressing or HIP process.

21 Claims, No Drawings

MANUFACTURING PROCESS FOR SINTERED CERAMIC BODY FOR CUTTING TOOLS

BACKGROUND

The present invention relates to a sintered ceramic body comprising alumina and titanium nitride (Al$_2$O$_3$—TiN type) which has conventionally been produced by pressing at a high temperature such as hot pressing- or HIP process. Particularly, the present invention relates to a sintered ceramic body having an improved toughness and abrasion resistance, i.e. an improved cutting properties rather than Al$_2$O$_3$—TiN type ceramic tools.

It has been known that the Al$_2$O$_3$—TiN type ceramic tools obtained by sintering a mixture of 5-40% by volume of TiN and the balance of Al$_2$O$_3$ by the hot pressing process (H.P. process) shows a relatively high resistance to oxidation and crater formation (Japanese Patent Application Open-laying No. 50-89410). However, since TiN per se has a hardness of Hv 2100 which stands lower than Hv 2700 of alumina per se, there have been some essential drawbacks in the abrasion resistance upon high speed cutting. Particularly, tips of such tools have been likely to chip off upon high speed intermittent cutting. A similar sintered ceramic body consisting of 5-15% by weight of TiN and the balance of alumina sintered by the hot-isostatic pressing process (HIP process hereinafter) is disclosed in Japanese Patent Application Openlaying No. 53-130208. This seramic tool showed some improvement in the abrasion resistance and thermal shock resistance. However, there is much to be desired particularly in the high speed cutting and the high speed intermittent cutting properties for the Al$_2$O$_3$—TiN type sintered ceramic bodies.

Furthermore, the sintering temperature of Al$_2$O$_3$—TiN system rapidly rises along with the increase of TiN content reaching about 1900° C., which sintering temperature rise would inevitably cause an undesired crystal growth of alumina grain. Thus it has been difficult to obtain a sintered ceramic body which has above mentioned necessary properties as a high speed cutting tool.

Accordingly, the object of the present invention is to provide a novel sintered ceramic body and a novel manufacturing process thereof which can eliminate the drawbacks of the prior art.

BRIEF SUMMARY OF THE INVENTION

The present invention is based on the inventors' finding after their eager investigations that a novel Al$_2$O$_3$—TiN type of ceramic body can be produced by adding a specified part of zirconium-containing component(s) such as zirconium (Zr), zirconium carbide (ZrC) and/or zirconium nitride (ZrN) to the Al$_2$O$_3$—TiN base component, which novel ceramics can be sintered under the pressure application by H.P. process or HIP process.

The present invention provides a sintered ceramic body for cutting tools obtained by sintering a mixture substantially consisting of 70-95% by volume of alumina and the balance of titanium nitride and one or more zirconium-containing components selected from the group consisting of zirconium, zirconium carbide and zirconium nitride, wherein the volumetric ratio of titanium nitride/zirconium-containing component(s) ranges between 95/5 and 50/50, inclusively under the pressure application. The resultant sintered ceramic body has a mean crystal grain size of not exceeding 2$\mu$ and a residual prosity of not exceeding 0.2% by volume, while the Zr-component might form oxide of Zr such as ZrO$_2$ or the like.

The present invention further provides an improvement in a manufacturing process of said new sintered ceramic body comprising: a step preparing a starting mixture substantially consisting of 70-95% by volume of alumina and the balance of titanium nitride and one or more zirconium-containing components selected from a group consisting of zirconium, zirconium carbide and zirconium nitride wherein the volumetric ratio of titanium nitride/zirconium-containing component(s) ranges between 95/5 and 50/50, inclusively, and a step sintering the starting mixture under the pressure application.

DETAILED DESCRIPTION OF THE INVENTION

According to the present invention, 70-95% by volume of Al$_2$O$_3$ is comprised in the sintered ceramics on the following reasons:

a. A lower incorporation of Al$_2$O$_3$ than 70% by volume would cause a poor development of hardness of the sintered body accompanied with separation and dropping-off of the grain particles from the sintered body upon cutting, thus bringing to a large abrasion of the cutting tool tips.

b. At a higher percent of Al$_2$O$_3$ than 95% by volume, the crystal grain growth of Al$_2$O$_3$ occurs developing a poor strength and hardness thus to cause a large abrasion upon use.

The volumetric ratio of TiN/Zr-containing component(s), i.e., a ratio of TiN/sum of Zr, ZrC and ZrN ranges 95/5-50/50. At a smaller ratio than 50/50, a poor sintering property is observed, i.e. the toughness tends to diminish. At a higher ratio than 95/5, the effective crystal grain growth-inhibiting features by incorporation of the Zr-containing component(s) are not realized enough.

In the present invention, the term "% by volume" represents a ratio based on the theoretical volume of each component.

As the starting Al$_2$O$_3$, $\alpha$-Al$_2$O$_3$ having a purity of not less than about 99.9% by weight and a mean particle size of not exceeding about 1$\mu$ may be used. Such $\alpha$-Al$_2$O$_3$ is preferably obtained by decomposing aluminium-containing salts or organic materials then calcinating the resultant substances rather than that by Buyer process.

As the starting TiN, TiN comprising not less than about 75% by weight of Ti and not less than about 20% by weight of N and having a mean particle size not exceeding about 3$\mu$ can be used. As one of such starting TiN, that obtained by nitriding sponge titanium in the nitrogen gas flow may be exemplified, while the manner for preparation of TiN is not limited thereto.

As the starting ZrC, ZrC comprising not less than about 11.3% by weight of carbon and having a mean particle size of not exceeding about 3$\mu$ can be employed.

As the starting ZrN, ZrN comprising not less than about 13.0% by weight of N and having a mean particle size of not exceeding about 5$\mu$ can be used.

As the starting Zr, Zr having a purity of not less than about 98% by weight and a mean particle size of not exceeding about 6$\mu$ may be used.

For all the starting materials other than Al$_2$O$_3$, a mean particle size of not exceeding 2$\mu$ is preferred. However, such particle sizes as aforementioned are not strictly limited thereto because mixing in the ball mill serves also as a milling step to prepare the starting mixture with required particle sizes.

The starting materials are mixed together throughly in a predetermined ratio therebetween preferably in a ball mill to bring the starting materials to an even particle size distribution, then optionally organic binder and/or diluent are further admixed thereto for compaction or pressing aid. The organic binder and/or diluent will be burned-off or evaporated during the initial course of sintering or presintering, i.e. during the heating-up course. Any known organic binder satisfying this requirement may be used. The diluent serves to decreasing and controlling the viscosity of the binder, and may be volatile organic solvent or the like. The organic binder also encompasses wax, camphor or the like which would not adhere to press forms. Preferably, around a few percents of camphor diluted with about 10 times by volume of ether is admixed to the starting material mixture. However, the organic binder can be eliminated for preparing sample pieces wherein compaction and compacted body can carefully be handled.

In the present invention, the sintering under the pressure application can be carried out by H.P. process or HIP process. Where the HIP process is employed, then the resultant mixture is preferably pressed into a pressed body by a known manner, the pressed body subsequently being brought into a vacuum furnace for presintering. The pressure for this pre-pressing ranges preferably approximately 1–3 ton/cm$^2$.

In the present invention, the term "sintering under the pressure application" denotes to sinter the starting mixture under a pressure of not less than 50 Kg/cm$^2$. In the H.P. process, an approximate pressure range of 50–500 Kg/cm$^2$, preferably 150–300 Kg/cm$^2$ is applied. The corresponding approximate sintering temperature is 1600°–1800° C., preferably 1600°–1700° C. The minimum pressure of 50 Kg/cm$^2$ is defined by its sintering effect, while the maximum pressure of 500 Kg/cm$^2$ is essentially defined by the furnace material.

For the HIP process, a pressure of approximately 500–3000 Kg/cm$^2$ preferably 1500–2000 Kg/cm$^2$ is applied, wherein the upper limit is defined essentially by the HIP furnace technology. The corresponding sintering temperature is approximately 1300°–1800° C., preferably 1450°–1500° C.

To determine the sintering temperature, the Zr-content and TiN content in the mixture are essential. Generally, a sintering temperature of 1300°–1400° C. is applied for sintering a ceramic body consisting of mere alumina, whereas the optimum sintering temperature rapidly rises along with the increase of the TiN content in the ceramic body finally reaching the maximum temperature of 1800° C. However, by the partial replacement of TiN with Zr-containing component of the optimum sintering temperature is reduced to some extent. Accordingly, an optimum sintering temperature is determined depending on the ratios of Al$_2$O$_3$/TiN and TiN/Zr in the starting mixture.

For the HIP process, the pre-pressed body to be sintered is preferably presintered to such a density that the pressure medium gas can not penetrate into the internal pores of the prepressed body, which density per se is generally known as a relative density of approximately 95% by volume. According to the present invention, a higher relative density can be obtained by the presintering step by the incorporation of Zr-containing components, wherein a preferred presinterring temperature is approximately 1300°–1500° C., most preferably 1450°–1500° C. However a temperature not exceeding 1800° C. depending on the TiN content may be applied.

The presintering is carried out in the vacuum and/or vacuum inert atmosphere because TiN, Zr, ZrC and ZrN are very likely to oxidize.

The terms "vacuum" and "vacuum inert atmosphere" for presintering conditions are meant as follows: The presintering can be carried out in the vacuum furnace under a vacuum of not exceeding about 1×10$^{-1}$ Torr, preferably approximately 1×10$^{-2}$–1×10$^{-3}$ Torr. The prepressed body can also be presintered in a vacuum inert atmosphere of which inert gas pressure approximately ranges not exceeding 200 Torr, preferably approximately 50–100 Torr. Within the inert atmosphere, those substantially consisting of inert gas, preferably Ar, He or a mixture thereof fall.

As a most preferred presintering mode, a two step mode of presintering can be employed, i.e., the first step being heating up to about 1300°–1350° C. in the vacuum as defined hereinabove, the second step being sintering at a higher temperature range of 1300°–1800° C., preferably within temperatures of 1450°–1500° C., in the vacuum inert atmosphere as prescribed hereinabove. A similar two step presintering mode for Al$_2$O$_3$—TiN type tool is disclosed in Japanese Patent Openlaying No. 55-7579.

If the presintering is not employed, the starting material is sintered charged in a metallic container in the HIP furnace so as to be hot-isostatically compressed.

The resultant presintered body is then brought into a HIP furnace, wherein the presintered body is sintered at a temperature of 1300°–1800° C., preferably 1450°–1500° C., however, not exceeding the maximum substantial presintering temperature under the pressure medium (gas) pressure which ranges 500–3000 Kg/cm$^2$, preferably 1500–2000 Kg/cm$^2$.

In another sintering mode of the H.P. process, the starting mixture or a pre-pressed body thereof is sintered at the aforementioned temperature and under the atmospheric condition or in the inert atmosphere. The pre-pressing may be carried out as well as that for HIP process.

The outcoming sintered ceramic body according to the present invention achieves a residual porosity of not exceeding 0.2% by volume measured by ASTM B276-54 and a mean crystal grain size of not exceeding 2$\mu$.

The effect of incorporation of the Zr-containing component(s) appears by adding 1% by volume of such component(s) solely or as a mixture, i.e., the relative apparent density remarkably increases thereby. It is construed that such feature can be realized by following reasons:

(1) Zr-containing component(s), i.e., Zr, ZrC and ZrN partly transforms into zircon oxide which improves the sintering.

(2) Zr, ZrC and ZrN would form lower oxide of Zr such as ZrO and intermediate reaction products with oxide such as Al$_2$O$_3$ and occasionally TiO which has been formed from TiN by its partial decomposition during the sintering. Those reaction products would improve the bonding strength between Al$_2$O$_3$ and TiN.

Without such incorporation of the Zr-containing component(s), a rapid grain growth of alumina is observed, which grain growth closes pores in the sintering body and brings no further increase in the density even if the sintering temperature would further be elevated.

In the present invention, the starting materials as aforementioned permit a further incorporation of one or more oxides selected from the group consisting of 0–1.0% of MgO, 0–0.6% of CaO and 0–0.6% of $Y_2O_3$, all by volume % which are known as common sintering agents or grain growth inhibiting agents for alumina.

EXAMPLES

Following examples are disclosed for a better illustration of the present invention and not for limitation thereof. Without aparting from the gist of the present invention any variation or modification may be adopted on the features of the present invention as disclosed hereinbefore as well as hereinbelow.

EXAMPLE 1

Commercially available $\alpha$-$Al_2O_3$ powder having a purity of 99.9% by weight and a mean particle size of 0.3$\mu$, commercial TiN (N 21.7 wt%) having a mean particle size of 1.2$\mu$ and commercial Zr (Zr 99.8 vol%), ZrC (C 11.6 wt%) of ZrN (N 13.2 wt%), alternatively, and having a mean grain size of 3.5$\mu$, 1.4$\mu$ or 1.2$\mu$, respectively, were mixed in compositions as listed in Table 1 and 500 g of the resultant mixture was milled throughly in a stainless steel ball mill charged with cemented carbide balls and 500 ml acetone for 40 hours.

From the resultant slurry, acetone was evaporated. The resultant mixture was then pressed into pressed pieces using a metallic die which permits a final sintered dimension of $13 \times 13 \times 5$ mm after sintering under application of a pressure of 2 ton/cm². The pressed pieces were brought into a vacuum furnace then heated up to 1300° C. in the vacuum of $(5-10) \times 10^{-3}$ Torr, then maintained at 1300° C. for a half hour. Then 50 Torr of Argon gas was introduced into the furnace, the temperature being raised up to 1650° C. subsequently maintained to presinter them at 1550° C. for 30 minutes. (Reference sample Nos. 10R–12R were sintered at 1700° C.).

Then the presintered pieces were put into the H.I.P. furnace and sintered at 1500° C. under an Argon gas pressure of 2000 Kg/cm² for a half hour. The resultant pieces having the prescribed dimension were ground to form 12.7 mm × 12.7 mm × 4.8 mm tips (SNP 432) and chamfered at cutting edges by 0.07 mm by a diamond wheel.

Thus obtained sample pieces were tested for their physical and cutting properties, test results being listed in Table 1, and test conditions in Table 2.

As shown in Table 1, Sample Nos. 1–8 which stands within the scope of the present invention, exhibited fairly reduced flank abrasion depths in the cutting test I, and fairly enhanced cutting times in the cutting test II. However, samples Nos. 9R–12R which deviate from the scope of the present invention exhibited rather greater flank abrasion depths and less cutting times.

TABLE 1

| Sample No. | Starting components % by vol. | | | | | Porosity (% by vol.) *1 | Mean grain size ($\mu$) | Hardness Rockwell 45N | Cutting Test I | Cutting Test II | Remarkes |
|---|---|---|---|---|---|---|---|---|---|---|---|
| | $Al_2O_3$ | TiN | Zr | ZrC | ZrN | | | | | | |
| 1 | 94 | 5 | | 1 | | 0.04 | 1.1 | 90.7 | 0.13 | 21 | present invention |
| 2 | 88 | 8 | | 4 | | 0.05 | 0.9 | 90.9 | 0.12 | 24 | present invention |
| 3 | 88 | 10 | 2 | | | 0.04 | 1.4 | 90.3 | 0.12 | 24 | present invention |
| 4 | 81 | 15 | | 4 | | 0.08 | 0.8 | 90.7 | 0.13 | 26 | present invention |
| 5 | 81 | 10 | | | 9 | 0.10 | 1.2 | 90.3 | 0.14 | 23 | present invention |
| 6 | 71 | 15 | | 7 | 7 | 0.14 | 0.9 | 90.1 | 0.13 | 24 | present invention |
| 7 | 71 | 22 | | 7 | | 0.09 | 0.8 | 90.0 | 0.14 | 23 | present invention |
| 8 | 90 | 9.5 | 0.5 | | | 0.04 | 1.5 | 90.0 | 0.15 | 24 | present invention |
| 9R | 96 | 2 | | 2 | | 0.13 | 2.7 | 87.7 | 0.31 | 16 | reference test |
| 10R | 81 | 19 | | | | 0.7 | 2.6 | 88.3 | 0.38 | 11 | reference test |
| 11R | 81 | 8 | | 11 | | 1.31 | 3.7 | 85.6 | 0.41 | 3 | reference test |
| 12R | 68 | 26 | | 6 | | 2.06 | 1.3 | 84.7 | 0.44 | 6 | reference test |

Remarks:
*1 Porosity was measured according to ASTM Designation B276-54

TABLE 2

| | | Cutting Test I | Cutting Test II |
|---|---|---|---|
| Tested Material | Material form | Cast iron FC 20 rod having 120 mm diameter × 400 mm length and circumferentially extending teeth with 15 mm wide crests axially arranged with 5 mm wide gap intervals | Cast iron FC 20 block having a cutting surface of 100 × 100 mm |
| Machine | | lathe | milling machine |
| Tool (tip) | | HN 31S - 4 | NLF 06R |
| Cutting Speed | | 920 m/min. | 177 m/min. |
| Depth of cut | | 0.5 mm | 1.0 mm |
| Feed | | 0.25 mm/rev. | 0.3 mm/tooth |
| Evaluation of | | flank abrasion depth (mm) after | number of cutting times before |

TABLE 2-continued

| | Cutting Test I | Cutting Test II |
|---|---|---|
| Tool Life | cutting 100 teeth | chipping off of the tool (tip); average times in 10 tests. |

EXAMPLE 2

The same starting mixture compositions as in Example 1, Nos. 2 and 4–8 were hot pressed in graphite dies at a temperature of 1750° C. under a pressure of 200 Kg/cm² for 15 minutes with the same sample piece dimension as in Example 1. The resultant sample pieces were tested on the same test conditions as shown in Table 2, the results being shown in Table 3.

TABLE 3

| Sample No. | Porosity (% by vol.) | mean grain size ($\mu$) | Hardness Rockwell 45N | Cutting Test I | Cutting Test II |
|---|---|---|---|---|---|
| 2H | 0.04 | 1.2 | 90.6 | 0.15 | 25 |
| 4H | 0.09 | 1.3 | 90.3 | 0.16 | 28 |
| 5H | 0.10 | 1.3 | 90.0 | 0.15 | 23 |
| 6H | 0.14 | 1.3 | 89.9 | 0.17 | 23 |
| 7H | 0.12 | 1.0 | 90.0 | 0.14 | 21 |
| 8H | 0.04 | 1.4 | 90.1 | 0.13 | 23 |
| 13R* | 0.10 | 1.8 | 88.0 | 0.21 | 16 |

*Reference test for Example 2

Al$_2$O$_3$ 75% by volume and the balance of TiN were mixed as in Example 1. The resultant mixture was hot pressed at 1800° C., under a pressure of 200 Kg/cm² for 15 minutes, which process corresponds to that disclosed in Japanese Patent Application Openlaying 50-89410.

We claim:

1. A manufacturing process of a sintered ceramic body for cutting tools comprising:
   a step of preparing a mixture substantially consisting of 70–95% by volume of alumina and the balance of titanium nitride and one or more zirconium-containing components selected from the group consisting of zirconium, zirconium carbide and zirconium nitride, wherein the volumeric ratio of titanium nitride/zirconium-containing component(s) ranges between 95/5 and 50/50, inclusively, and
   a step of sintering the mixture under the application of pressure, and under such conditions that the resulting body has a residual porosity not exceeding 0.2% by volume and a mean alumina crystal grain size not exceeding 2$\mu$.

2. The process of claim 1, wherein the sintering is carried out under a pressure of not less than 50 kg/cm².

3. The process of claim 1, wherein the sintering pressure is 150–3000 kg/cm².

4. The process of one of claims 1–3, wherein the sintering is carried out by a hot pressing process.

5. The process of one of claims 1–3, wherein the sintering is carried out by a hot-isostatic pressing process.

6. The process of claim 4, wherein the sintering is carried out at a temperature of approximately 1600°–1800° C. under a pressure of 150–500 kg/cm².

7. The process of claim 5, wherein the sintering is carried out at a temperature of 1300°–1800° C. under a pressure of 500–3000 kg/cm².

8. The process of claim 1, wherein the mixture is prepressed, presintered in the vacuum and/or in the vacuum inert atmosphere then sintered by the hot-isostatic pressing process.

9. The process of claim 8, wherein the presintering temperature is approximately 1300°–1800° C.

10. The process of claim 8, wherein the presintering is carried out in a two step mode, first presintering step being up to 1300° C. in the vacuum and the second presintering step being at a temperature of 1300°–1800° C. in the vacuum inert atmosphere.

11. The process of claim 9 or 10, wherein the sintering temperature by the hot-isostatic pressing process is between 1300° C. and the substantial maximum presintering temperature of the presintering step.

12. The process of claim 10, wherein the first presintering is carried out in a vacuum of $1 \times 10^{-1} - 1 \times 10^{-3}$ Torr and the second presintering in a vacuum inert atmosphere of 10–200 Torr.

13. The process of claim 8 or 10, wherein the vacuum inert atmosphere is substantially composed of Ar, He or a mixture thereof.

14. The process of claim 1, wherein the starting alumina has a purity of not less than 99.90% by weight and a mean particle size of not exceeding 1$\mu$.

15. The process of claim 1, wherein the starting titanium nitride comprises not less than about 75% by weight of titanium and not less than about 20% by weight of nitrogen, and has a mean particle size of not exceeding 3$\mu$.

16. The process of claim 1, wherein the starting zirconium carbide comprises not less than about 11.3% by weight of carbon and has a mean particle size of not exceeding 3$\mu$.

17. The process of claim 1, wherein the starting zirconium nitride has not less than about 13.0% by weight of nitrogen and a mean particle size of not exceeding 5$\mu$.

18. The process of claim 1, wherein the starting zirconium has a purity of not less than about 98% by weight and a mean particle size of not exceeding 6$\mu$.

19. The process of claim 1, wherein the mixture of said starting materials is beforehand finely comminuted.

20. The process of claim 1, wherein the starting material further comprises 0–1.0% MgO, 0–0.6% CaO and 0–0.6% of Y$_2$O$_3$, each by weight.

21. The process of claim 1, 6 or 7, wherein the staring material is prepressed before the sintering step.

* * * * *